June 4, 1968  G. N. BROWN  3,386,707
PROCESS AND APPARATUS FOR BLENDING
Filed March 9, 1965  4 Sheets-Sheet 2
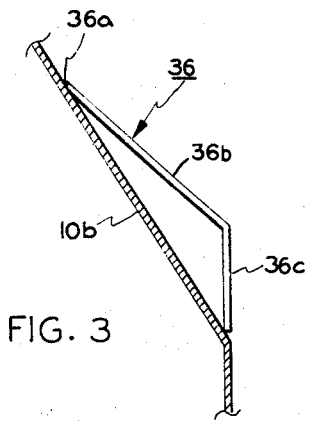
FIG. 3
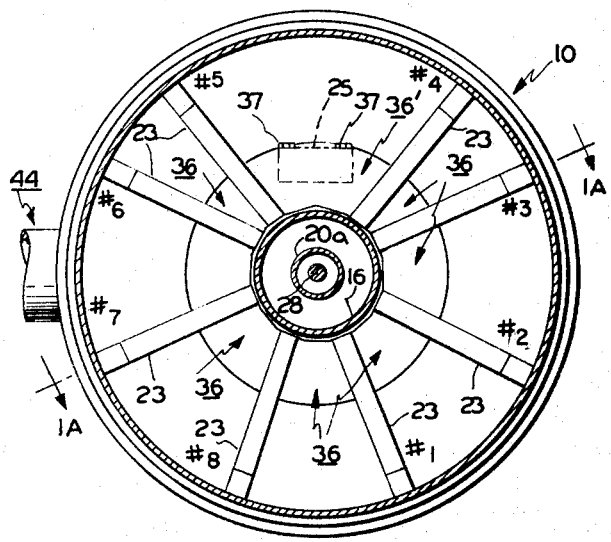
FIG. 2
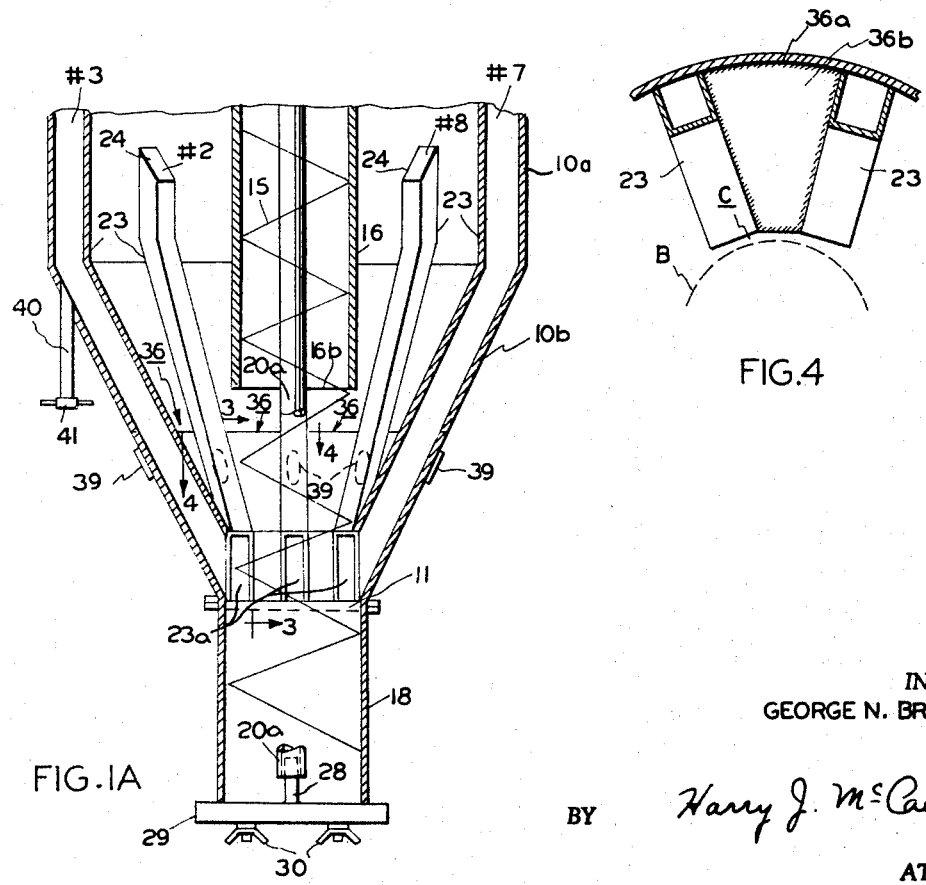
FIG. 4
FIG. 1A
INVENTOR
GEORGE N. BROWN
BY *Harry J. McCauley*
ATTORNEY

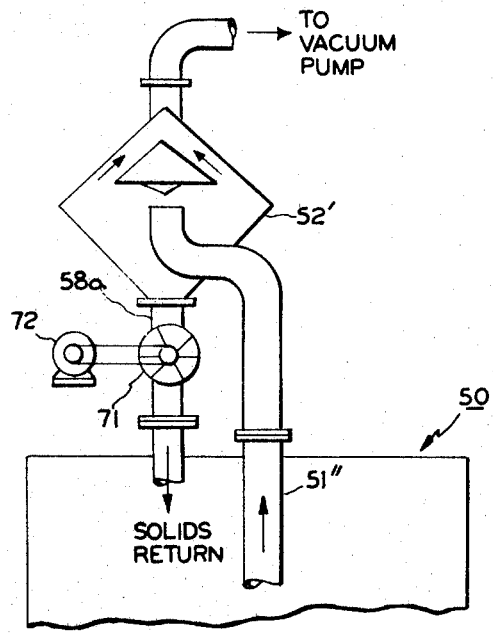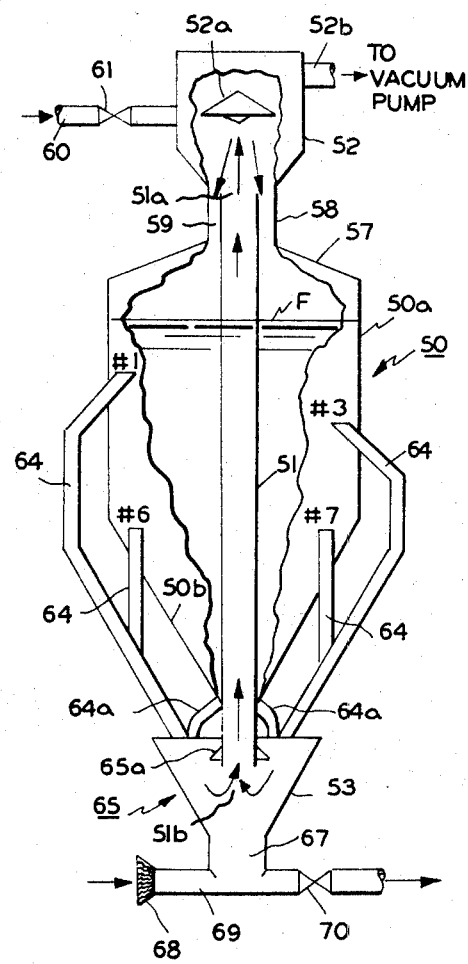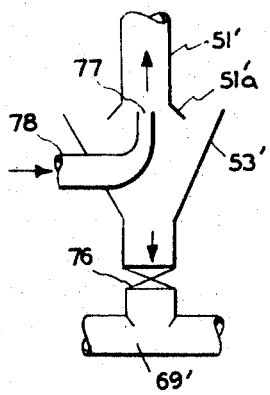

United States Patent Office 3,386,707
Patented June 4, 1968

3,386,707
PROCESS AND APPARATUS FOR BLENDING
George N. Brown, Wilmington, Del., assignor to E. I. du Pont de Nemours and Company, Wilmington, Del., a corporation of Delaware
Filed Mar. 9, 1965, Ser. No. 438,275
5 Claims. (Cl. 259—97)

This invention relates to a method and apparatus for the blending of solids, and particularly to a gravity-flow type of blending wherein solids are withdrawn simultaneously from a multiplicity of levels within the heterogeneous solids mass at points peripherally adjacent thereof, recombined and recycled one or more times.

Solids blending is desirable in many manufacturing processes, especially those wherein the solids are the products of individual batch operations and, as a result, possess more or less varying properties. A typical example taken from the chemical industry is the manufacture of polyethylene, wherein the product has the form of cubes measuring about 1/8" on a side.

Reissue Patent 25,687 taught a method and apparatus for the gravity-flow blending of solids which has proved advantageous from the standpoint of economy in equipment required as well as good blending capability, and this invention is an improvement thereon especially intended for specific solids which require very intensive blending effort in order to obtain the most intimate blends as the final product.

In effect, this invention contemplates the combination of gravity-flow blending with the conventional screw-type mechanical blending of the prior art, or with its gas lift equivalent, to thereby obtain unexpected advantages not hitherto achieved by either of these blending techniques individually.

Figure 5:
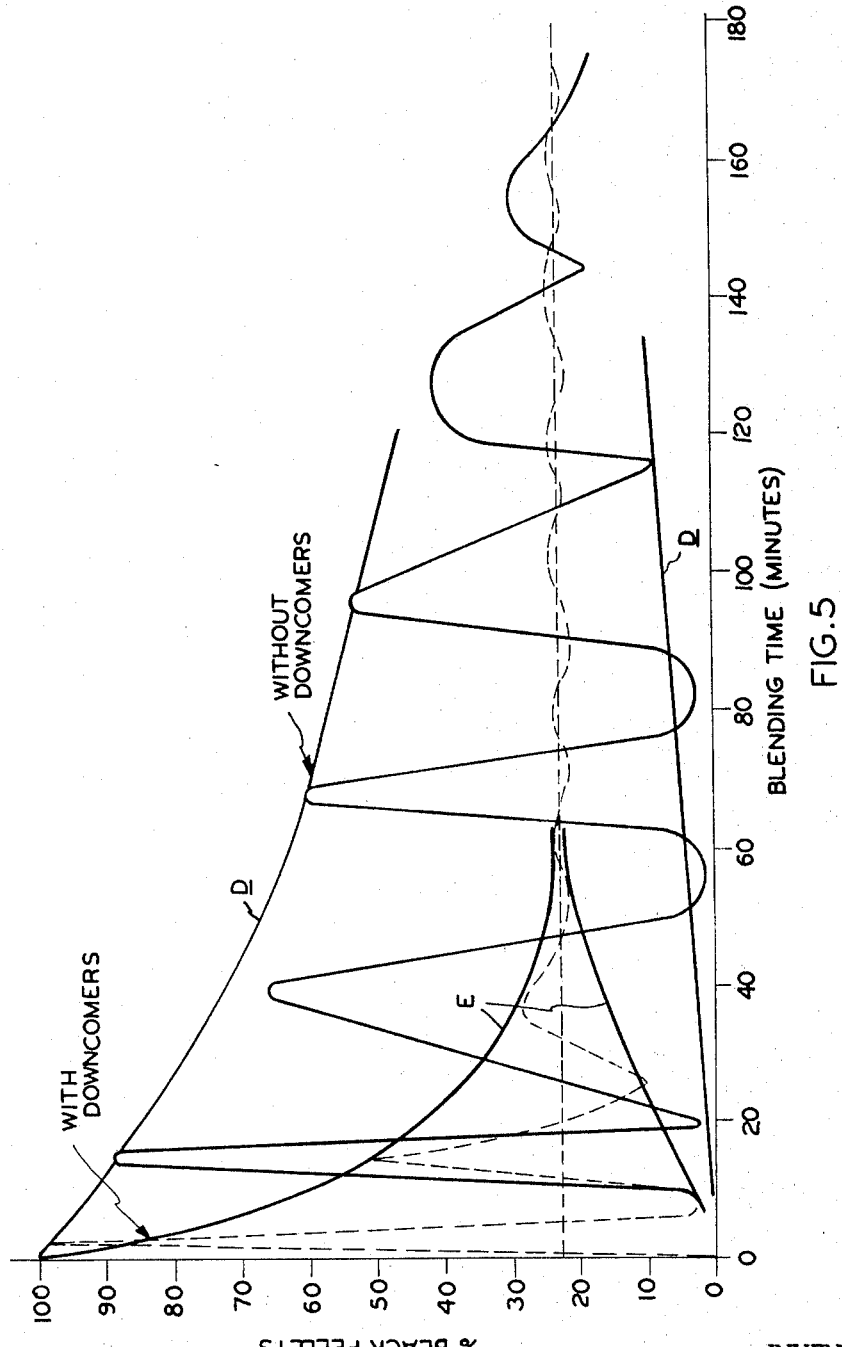

An object of this invention is to provide an improved method and apparatus for the gravity-flow blending of solids wherein a high time rate of recycle is obtainable at relatively low cost and with compact equipment. Another object of this invention is to provide an improvement in uniformity of return of recycled product after each successive transit of solids through the multiple apparatus draw-offs. Another object of this invention is to provide a method of blending which is less dependent as regards blending quality on critical location of solids draw-offs, variances in rates of flow between individual solids draw-offs, and temporary bridging or other hold-ups of solids movement than prior art blending processes. The manner in which these and other objects of this invention are achieved will become clear from the following detailed description and the drawings, in which FIG. 1 is a side elevation view of a preferred embodiment of blender according to this invention utilizing a screw conveyor for recycle, details of draw-off discharge openings being omitted for purposes of clarity of representation at the scale employed, FIG. 1A is a sectional side elevation view of the lower cone portion of the apparatus of FIG. 1 taken on line 1A—1A of FIG. 2 showing particularly the solids draw-off discharge opening arrangement, FIG. 2 is a section on line 2—2, FIG. 1 showing the angular disposition of the solids draw-offs ranged around the periphery of the blending vessel, FIG. 3 is a fragmentary side elevational cross-sectional view taken on line 3—3, FIG. 1A, of the cone bottom wall of the blending vessel of FIGS. 1, 1A and 2 detailing the construction and attachment of closure plates adapted to close off the space separating adjacent discharge ends of the solids draw-offs in the region of recombination of the solids prior to recycle return, FIG. 4 is a plan view of a closure plate of the design shown in FIGS. 1A, 2 and 3 in relationship to adjacent solids draw-off conduits taken on line 4—4, FIG. 1A, FIG. 5 is a plot of comparative blending efficiencies for a blender constructed according to this invention and a conventional vertical screw type blender, FIG. 6 is a side-elevational view, partly in broken section, showing another embodiment of blending apparatus according to this invention utilizing a vacuum-induced gas-lift for recycling solids return, FIG. 6A is a modification of the apparatus shown in FIG. 6 adapting it to pressurized gas-lift operation for recycling solids return, and FIG. 7 is a fragmentary sectional view of a modification in design of the upper end of the apparatus shown in FIG. 6 incorporating an air lock in prevention of short circuiting air flow through the main body of the solids in process.

Generally, blending according to this invention comprises confining a mass of the heterogeneous solids in an elevated column of annular horizontal cross-section, withdrawing from the mass in a generally vertical direction substantially equal amounts of the solids per unit time simultaneously by gravity flow from a multiplicity of regions disposed peripherally of the mass and spaced angularly apart with solids-receiving inlets disposed at preselected heights within the column, combining the substantially equal amounts of the solids to produce a solids blend having improved homogeneity of composition, and recycling the solids blend by elevation of the blend to the top of the elevated column co-axially thereof with discharge radially outwards of the annular horizontal cross-section.

Figure 1:
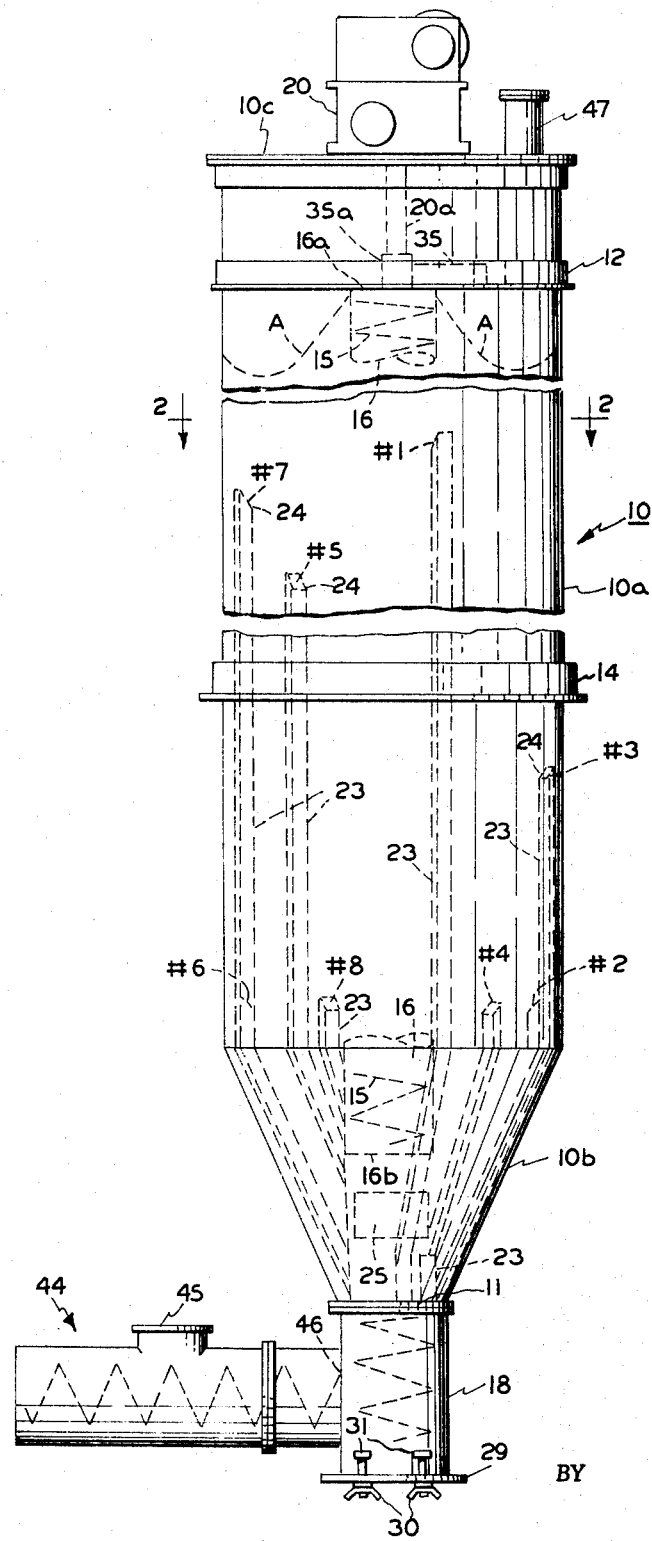

Referring to FIGS. 1, 1A and 2, the blending vessel 10 consists of a vertically mounted, elongated cylindrical portion 10a typically 25' high x 4'-6" internal diameter, provided with a frusto-conical bottom 10b, typically 3'-6" in length, drawn to a flanged opening 11 of about 6" diameter at the reduced end. Flange rings 12 and 14, attached by welding to the outside of cylindrical portion 10a, constitute weight transmission members for the blending apparatus and its contents, and are adapted to rest on adjacent floors (not shown) cut away to receive the apparatus in vertical orientation.

Co-axially mounted within vessel 10 is the solids return means which, in this embodiment, is a screw conveyor 15 (typically, 12" diameter) mounted for free rotation within a tubular housing 16 (typically of 13" inside diameter) of circular external cross-section, the open material exit end 16a of which housing is disposed centrally of the top interior of vessel 10 at a distance of, typically, 2' from the top of the vessel. Housing 16 is mounted within vessel 10 by suitable stays or brace members, not detailed, anchored to the inside wall of cylindrical portion 10a by welding or bolt attachment, with the lower material input end 16b disposed about half-way down the length of bottom portion 10b, although screw conveyor 15 is continued down past opening 11 to the bottom of well pipe 18, flange-connected to opening 11.

Screw conveyor 15 is power-driven at, typically, 120 r.p.m. by motor-speed reducer combination 20 mounted on the top closure 10c of vessel 10 through power delivery shaft 20a, which is journaled in bearings internally mounted within motor-speed reducer 20. Shaft 20a can thus conveniently comprise a depending pipe which requires no bearing at its lower end, disposed near the bottom end of well pipe 18, but is preferably strengthened against unrestrained deflection laterally by a gudgeon pin 28 integral with closure plate 29, sealing off the lower end of well pipe 18. Closure plate 29 is secured in place by a number of bolts 30 spotted in slots cut at convenient intervals around the periphery of plate 29 and engaged with internally threaded lugs welded to the outside periphery of well pipe 18. As best shown in FIG. 1A, gudgeon pin 28 extends a short distance inwardly of the bottom end of shaft 20a in concentric relationship with the shaft when the blending apparatus is empty, pin 28 preventing any extensive eccentric rotation of shaft 20a which might result from temporary overloads or other causes during the blending process. Actually, the solids mass within the apparatus is normally evenly enough distributed circumferentially of shaft 20a as to effectively bar eccentric rotation thereof, so that pin 28 is largely a standby protective measure.

Optionally, a radially disposed rotary flinger blade 35 (FIG. 1), keyed to shaft 20a through collar 35a so as to rotate therewith, is provided just above the material exit end 16a of housing 16, so as to distribute recycled solids more uniformly across the annular interspace separating housing 16 from the inside of the vessel cylindrical portion 10a. Best blending is achieved when free discharge of solids is permitted out of the upper end of the recycling conveyor, a typical operating solids level denoted by profile line A giving good results. This corresponds to a blender working capacity of approximately 350 ft.³ for the apparatus of typical dimensions hereinbefore cited.

Gravity-withdrawal of solids to be blended is effected by providing a multiplicity of downcomers 23, referred to interchangeably as draw-offs in this description, which are provided at their upper ends with beveled openings 24 slanted downwardly (typically at a 30° angle with the vessel wall) inwards radially of cylinder 10a, which downcomers are, in the design detailed, of square cross-section measuring, typically, 3" x 3".

There are, in the design detailed, eight internally mounted downcomers 23 (although they could just as well be mounted exteriorly of vessel 10 as hereinafter particularly taught for the embodiment of FIG. 6) which, preferably, are spaced equiangularly one from another, in order to increase blending speed and also for convenience in blender fabrication. However, this principle need not be rigorously observed, and downcomers 23 denoted Nos. 4 and 5 (see FIG. 2 particularly) are disposed only 25° center-to-center away from their neighboring downcomers Nos. 3 and 6, respectively, as compared with a uniform 45° spacing adhered to for all of the remaining downcomers. This angular enlargement in spacing for downcomers Nos. 4 and 5, which amounts to a full 85°, was adopted to permit space for the accommodation of the blender clean-out and inspection door 25, screw-attached to the lower end of frusto-conical bottom 10b.

This is accomplished at substantially no penalty, due to the exceptional design flexibility in angular placement of the downcomers which is afforeded by the enhanced blending capability obtainable with this invention.

Observations during operation have shown that the transit of the solids through the blending vessel 10 is largely as mass, or plug, flow, by which is meant that the entire blender contents intermittently drops downwardly in a succession of small discrete step movements. There does occur some lateral funnel-like movement of solids toward the material intake openings 24 of downcomers 23, but this is minor as compared to the vertical displacement. Accordingly, it is advantageous to preselect the location of downcomer solids intakes 24 at levels lengthwise of the blending vessel 10 such that each is adapted to service substantially equal incremental volumes of the total solids loading lying thereabove, making allowance for some lateral deflectional solids flow as well as the main vertical flow.

Using these principles, good blending was obtained by locating downcomers Nos. 2, 4, 6 and 8 (which are alternately disposed angularly in relationship to higher rising downcomers Nos. 3, 5, 7 and 1, respectively) with entry openings 24 at approximately the same level of 6"–11" above the line of joinder of cylindrical portion 10a with frusto-conical bottom 10b. The remaining four downcomers were then disposed, somewhat arbitrarily, with solids entry openings at approximately the 25% (No. 3), 40% (No. 5), 50% (No. 7) and 65% (No. 1) height points along cylindrical portion 10a measured from the same line of joinder.

The discharge ends 23a of all of the downcomers are brought to a common level just above flanged opening 11, where they are spaced circumferentially around the lower end of frusto-conical bottom 10b in close adjacency to conveyor screw 15, typically about 1" radially clear thereof. The space between the lower runs of adjacent downcomers 23 is closed off by filler plates 36, which are attached to the cone bottom 10b inside wall by welding along their upper edges 36a, and to the side walls of the downcomers 23, after which they slope radially inward as surfaces 36b along the terminal lengths of the downcomers to the outlet openings 23a for distances of typically, about 13", and then drop vertically as surfaces 36c over lengths of about 7", which latter portions close off the spaces between adjacent outlets 23a. Filler plate 36' has generally the same construction as plates 36, except that it is not weld-attached but is instead hinged snugly at 37 to the inside wall of cone 10b to permit free movement upwards out of the way when inspection or clean-out is to be effected through inspection door 25 disposed behind it.

The filler plates have the dual function of sealing off the converging interspaces between downcomers, which otherwise collect solids which can contaminate succeeding batches of solids to be later blended, and also providing for smooth uniform flow of solids circumferentially of the entire lower end of cone bottom 10b. As best seen in FIG. 4, the periphery B of screw 15 is, in plan, a circle inscribed loosely within a polygon made up of the straight uppermost edges of downcomer outlets 23a and the filler plate boundaries of surfaces 36b and 36c, which leaves a circumferential opening C of about 0.5" average radial width for the gravity-flow escape of solids from cone bottom 10b. This latter, then, is the equivalent of a downcomer 23 reserved to draw-off of solids from cone bottom 10b exclusively, and is preselected as to dimensions to afford substantially equal volumetric solids flow rate with all of the other downcomers 23.

It is preferred to provide solids flow verification sight glasses 39 (FIG. 1A) in the terminal runs of downcomers 23 and emergency flow-clearing nipple connections 40 below the line of joinder of cylindrical portion 10a and cone bottom 10b in alignment with the vertical runs of the downcomers. The vessel wall is drilled to provide open communication with nipples 40, which are attached to the vessel at their upper ends by welding. The lower ends of the nipples are closed off with screw caps 41, which can be removed in the event of solids flow stoppage to permit manual insertion of a blockage dislodgement rod, air hose or the like into any non-functioning downcomer.

The blender can be conveniently loaded with solids by a power-driven side feeding screw conveyor represented generally at 44, the solids inlet connection to which is indicated at 45 and the discharge 46 of which is through an opening provided in the side of well pipe 18. During loading, conveyor 44 is, of course, operated simultaneously with screw conveyor 15, so that freshly introduced charge is supplied by conveyor 44 directly to the recycle means and thence delivered to the annular solids storage space within vessel 10 through material exit end 16a.

Blended solids discharge from vessel 10 is conveniently effected by removing closure plate 29 from the bottom end of well pipe 18 and temporarily operating screw conveyor 15 in reverse, to thereby controllably deliver solids downwardly out through pipe 18 instead of upwardly into the blender storage space. Preferably portable hoppers or other relatively large volume receivers (not shown) are provided for the reception of successive batches of blended product from the apparatus.

Finally there is provided a flanged pipe connection 47 in the vessel top plate 10c to permit flooding the inside of vessel 10 with an inert gas, or applying a vacuum to the vessel contents, as may be required for specific kinds of solid materials processed. In some instances it is advantageous to simultaneously cool the solids while effecting blending by circulation of cooling air through the solids mass, which air can be readily supplied through inlet 45, or by independent connection to well pipe 18, and discharged from vessel 10 by vacuum application to pipe connection 47.

In operation, solids are withdrawn through downcomers 23 via offtakes 24 in substantially equal volumes per unit time from the generally equal volumes of solids within the blender annular interspace serviced by individual downcomers, the solids flow rate through the downcomers being at least three times greater than the general rate of downward progression of the solids mass within the blender vessel proper. Downcomers 23 discharge their contents via outlets 23a to a common collection zone in the lower end of cone bottom 10b opposite open conveyor screw 15, from whence the solids are rapidly withdrawn upwardly as recycle through tubular housing 16 and discharge evenly therefrom through material exit end 16a. Conveyor screw 15, located the same radial distance inwardly from all downcomer outlets 23a, effectively meters the discharge of solids through each, so that substantially equal solids flows are obtained from all of the downcomers without the need for any other flow regulatory devices, such as valves or the like. Also, screw 15 elevates any solid material collected in well pipe 18 and also entrains a large amount of the solids delivered from cone bottom 10b via filler plates 36 throughout the full open screw length between opening 11 and material input end 16b, so that the solids recycled by the screw conveyor are in very intimately blended condition by the time they are delivered from material exit end 16a. Recycle is also effected at a very high rate, typically, 1000 ft.³/hr., for the apparatus detailed, so that the entire progress of blending is accelerated.

In one manufacturing utilization, it was necessary to blend thermoplastic polymer to very intimate blends with periodic withdrawals of 25% of the blender capacity for employment as feed stock to individual extrusion machines. This operation was satisfactorily effected at regular draw-off intervals of approximately 60 minutes, with concurrent replacement by an equal volume of raw stock at each draw-off. The blending cycles were of about 45 minutes actual blending time duration, with 15 additional minutes required for blended product removal and charging of raw replacement polymer. Consistently high blended quality was maintained over months of plant operation during which practically the full range of acceptable specification variations of product characteristics was encountered. The extrusion machines supplied with the blend required a minimum of compensatory adjustment of settings, indicating that troublesome characteristic peaks and valleys were largely eliminated by the averaging effect of intimate blending.

The comparative blending efficiency of apparatus employing a recycling screw conveyor solely, and such a conveyor in association with gravity-flow downcomers according to this invention is demonstrated by the data plot of FIG. 5, using a recycle rate of approximately 30,000 lbs./hr. Here the charge was 10,000 lbs. of pellet polymer in the proportions of approximately 2300 lbs. of black pellets to 7700 lbs. of white pellets, the polymer being charged as a first pure white layer upon which was piled the black pellets as a second pure layer. The rapid fluctuation and large magnitude change in percent black pellet content found to exist in samples withdrawn at one minute intervals at the bottom of well pipe 18 was reduced over a relatively short period of time with the apparatus according to this invention, as indicated by the broken line trace of FIG. 5, so that highly acceptable blend quality (within about ±2 percent of theoretical proportions) was obtained after about 45 minutes blending time, corresponding to only about 2.5 solids turnovers. In sharp contrast, the screw type blender, test samples of the loading of which were taken from the upper, discharge end of the screw conveyor, the blend for which is shown in full line representation in FIG. 5, displayed very large variations in black pellet content and never did achieve a blending quality of better than about ±8.5 percent of theoretical proportions, even after the lengthy blending time of 180 minutes, when the test was halted. The comparative overall efficacy of each of the blending methods is particularly evident from the envelope lines drawn to the cyclical plots of black pellet content, that denoted D being for screw conveyor recycle solely, whereas that denoted E is for screw conveyor recycle plus associated downcomers.

The specific blender design hereinabove described in detail is particularly adapted to batch operation; however, this invention is certainly not limited to batch-type operation but can also be utilized with concurrent partial delivery of product to the point of use while at the same time conducting recycle as regards a substantial amount of the solids. The latter operation, as well as other flexibility, is facilitated by the incorporation of a common collector and unloading auxiliary such as that disclosed in U.S. application S.N. 438,276, now Patent No. 3,273,-864, filed of even date herewith, and thus not further treated herein.

Referring to FIG. 6, a second embodiment of apparatus for blending according to this invention utilizes a vacuum-induced air lift instead of a screw conveyor for solids recycling, which in some cases is especially advantageous, such as, for example, in circumstances where large scale air cooling of the solids is desired simultaneously with effectuation of blending.

The blending vessel 50 again consists of a vertically disposed upper cylindrical section 50a joined at the lower end to a frusto-conical section 50b, the air lift pipe 51 being co-axially mounted therewithin, with upper outlet end 51a discharging into dust separator 52 and lowermost solids intake end 51b opening into the bottom of common solids collection vessel 53. Vessel 50 is closed off at the top with a frusto-conical closure plate 57 provided with a central opening defining, with air lift pipe 51, an annular opening of, typically, 8″ radial width, to which is connected pipe 58 joining the upper end of vessel 50 with the reduced diameter end of the frusto-conical bottom of dust collector 52. This construction provides an annular passage 59 connecting the dust collector 52 with the top interior of vessel 50, and it is via this passage that the solids complete their course of recycle transit.

The design of dust separator 52 detailed is of the type disclosed in U.S. application S.N. 355,395, now Patent No. 3,312,342, employing a centrally disposed impacting plate 52a against which the solids impinge after exiting from discharge opening 51a of air lift pipe 51. The coarse solids constituting the blending stock are then deflected downwardly in a generally diverging conical curtain, as indicated by the arrows pointing away from plate 52a, discharging through pipe 58 into blending vessel 50. Fines are simultaneously elutriated through the curtain of coarse solids and are exhausted through discharge line 52b leading to a conventional bag filter and vacuum source not shown.

The apparatus can be conveniently loaded by introducing the raw solids to be blended into dust separator 52 through a pneumatic conveyor line 60 provided with a valve 61, which latter is closed off during the blending operation.

For apparatus in the 200–500 ft.³ operating capacity, the same number of downcomers as detailed for the embodiment of FIG. 1 has proved successful. Using a 500 ft.³ size as an example, typical dimensions are height of cylindrical section 50a, typically, 19′, diameter of 50a 6′ and height of frusto-conical section 50b 5′-2″. There are four exteriorly mounted downcomers 64 (typically, 3″ diameter pipes) spotted equiangularly 90° apart around the periphery of section 50a only the topmost, No. 1, and the next to the lowest, No. 3, of which appear in the sectional view of FIG. 6. The spacings of these downcomers are as follows, measured downwardly from the operating level line of filling denoted F: No. 1, 3′-0″; No. 2, 6′-9″; No. 3, 10′-6″ and No. 4, 14′-3″. The four downcomers Nos. 5–8, inclusive, only Nos. 6 and 7 of which appear in FIG. 6, are again equiangularly spaced one from another at 90° intervals around the frusto-conical bottom section 50b, but 45° around from the upper downcomers Nos. 1–4. These have their intake openings in a common horizontal plane at a radial distance of 24″ from the blender axis. Finally, draw-off in the apex region of section 50b is effected by two oppositely disposed draw-off pipes 64a, which each service opposite halves of the lower cone volume by withdrawals at points adjacent air lift pipe 51. None of the downcomers are manifolded with others, but each individually discharges at the same horizontal level into a common solids collector 65.

The solids collector, denoted generally at 65, is of the solids feed self-equalizing type disclosed in U.S. application S.N. 320,704, now Patent No. 3,208,737, and embodies a flow restrictor 65a (shown in section in FIG. 6) which, in this instance, has the form of an upright frustum of a cone. Solid material escaping from the discharge ends of downcomers 64 and 64a is temporarily accumulated by flow restricter 65a before sliding past the restricter periphery into the lower part of vessel 53. Restricter 65a thus throttles the flow of material out of each of the downcomers individually, thereby equalizing the solids flows through all of them.

Air flow induced by a vacuum of, typically, 8.7 lbs./sq. inch absolute pulled by the vacuum pump connected to line 52b is supplied to air lift pipe 51 via air supply line 69, provided with a filter 68 on the air input side, connecting with air introduction port 67 opening into the lower end of vessel 53 and entrains the solids to thereby effect recycle via dust separator 52 and annular passage 59. When blending is completed, which, depending to some degree upon the specific solids involved is usually accomplished after three content turnovers, the blender contents are discharged from the apparatus in any desired amount by discontinuing vacuum application to blending vessel 50, opening valve 70 and air-entraining the solids by air pressure applied via a line connected around filter 68 to storage, packaging facilities or consuming mechanisms, such as extrusion feeders or the like, not shown.

It is also feasible to provide the air lift by gas pressure application solely, if desired, preferably with the slight modification shown in FIG. 6A in order to minimize short-circuiting air flow through the main solids bed held within vessel 50. Thus, valve 70 is replaced by a valve 76, closed during blending but opened during unloading, interposed between air-unloading line 69′ and solids collection vessel 53′. The lower end of air lift pipe 51′ is belled outwardly at 51′a to receive the reduced end 77 of nozzle 78, which is supplied with air under pressure from any convenient source, such as by connection with line 69′ (not detailed), or from an independent point. A relatively low gas pressure of the order of 6 lbs./sq. in. gage suffices. Operation is in all respects the same as that taught for the vacuum-induced embodiment.

With some solids materials, especially those of relatively low density or high bulk porosity, some entrainment air can be diverted by back flow up the downcomers 64 and 64a and through the solids mass occupying vessel 50. This is objectionable; however, the difficulty is easily overcome by modifying the design shown in FIG. 6 to substitute a single full-diameter pipe 58a for pipe 58, as shown in FIG. 7, and installing a rotary star valve 71 in series flow arrangement therewith to meter positively the flow of solids from dust separator 52′ into blending vessel 50′ as the valve is driven in rotation by motor 72. Star valve 71 thus acts as an air lock between the blender and the dust separator, restricting air flow solely to that employed for solids entrainment recycle via air lift pipe 51″.

In operation, the embodiment of apparatus detailed in FIGS. 6, 6A and 7 functions very much like the screw type recycle blender of FIGS. 1–5, inclusive, hereinbefore described, except that the refinement of concurrent dust separation by the integration of the impact-elutriation technique of application Ser. No. 355,395, now Patent No. 3,312,342, supra is particularly facilitated, since gas entrainment is relied upon exclusively to effect recycle.

In both cases recycle is accelerated greatly over the blending methods of the prior art, which therefore reduces the time expenditure necessary to obtain a preselected level of blending quality. Moreover, in uses where rapid temperature equalization is imperative, as in the blending of temperature-sensitive hot and cold solid materials, or wherein flowing gas streams are utilized concomitantly with the blending to effect heat transfer to or from the solids in process, a high rate of solids recycle is extremely advantageous. At the same time, co-axial internal recycle of the solids has resulted in an unexpected improvement in solids gravity-flow patterns within the blending vessel, which increases the flexibility of downcomer placement and, at the same time, improves solids flow uniformity, enabling the processing of an enlarged range of materials with a minimum of difficulties.

From the foregoing, it will be understood that this invention can be modified extensively within the skill of the art without departure from its essential spirit, and it is accordingly intended to be limited only within the scope of the appended claims.

What is claimed is:

1. The method of blending solids comprising confining a mass of the heterogeneous solids in an elevated column of annular horizontal cross-section, withdrawing from said mass in a generally vertical direction substantially equal amounts of said solids per unit time simultaneously by gravity flow from a multiplicity of regions disposed peripherally of said mass and spaced angularly apart in progression lengthwise of said column, combining said substantially equal amounts of said solids to produce a solids blend having improved homogeneity of composition, and recycling said solids blend by elevation of said blend to the top of said elevated column co-axially thereof with discharge radially outwards of said annular horizontal cross-section.

2. The method of blending solids according to claim 1 wherein said mass of solids is subjected to recycling two or more times.

3. A gravity-flow solids blender comprising, in combination, an elevated vessel of circular cross-section provided with a co-axial tubular solids return means of circular external cross-section in open communication at its upper material exit end with the top interior of said vessel, and means withdrawing solids from said vessel by gravity flow in substantially equal amounts per unit time from a multiplicity of regions disposed peripherally of said vessel and spaced angularly apart in progression lengthwise of said vessel and delivering said solids to the lower material input end of said tubular solids return means as recycle to said top interior of said vessel.

4. A gravity-flow solids blender according to claim 3 wherein said co-axial tubular solids return means of circular external cross-section is a gas entrainment lift consisting of a tubular housing open at said upper material exit end to the top interior of said vessel and open at said lower material input end in the region receiving solids withdrawn from said vessel and delivered as said recycle, said tubular housing being provided with means supplying a substantially steady flow of solid-entraining gas to said lower material input end at a point below the level of material input constituting said recycle.

5. A gravity-flow solids blender comprising, in combination, an elevated vessel of circular cross-section provided with co-axial solids return means consisting of a power-driven screw conveyor of configuration effecting vertical lift mounted co-axially for free rotation within a tubular housing open at its upper material exit end to the top interior of said vessel and open at its lower material input end in the region receiving solids withdrawn from said vesesel and delivered as recycle, and means withdrawing solids from said vessel by gravity flow in substantially equal amounts per unit time from a multiplicity of regions disposed peripherally of said vessel and spaced angularly apart in progression lengthwise of said vessel and delivering said solids to said lower material input end of said solids return means as recycle to said top interior of said vessel.

References Cited

UNITED STATES PATENTS

| | | | |
|---|---|---|---|
| 3,029,986 | 4/1962 | Horn et al. | 259—180 |
| 3,143,336 | 8/1964 | Byberg | 259—97 |
| 3,145,975 | 8/1964 | Towns | 259—95 |
| 3,158,362 | 11/1964 | Seifarth | 259—95 |
| 3,167,306 | 1/1965 | Clark | 295—95 |
| 3,198,492 | 8/1965 | Schneider | 259—95 |

FOREIGN PATENTS 523,717 10/1953 Belgium.

ROBERT W. JENKINS, *Primary Examiner.*